(12) United States Patent
Kobayashi et al.

(10) Patent No.: US 8,648,311 B2
(45) Date of Patent: Feb. 11, 2014

(54) RADIATION DETECTOR

(75) Inventors: Tamaki Kobayashi, Isehara (JP);
Tatsuya Saito, Kawasaki (JP); Nobuhiro Yasui, Yokohama (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/530,243

(22) Filed: Jun. 22, 2012

(65) Prior Publication Data

US 2013/0015360 A1   Jan. 17, 2013

(30) Foreign Application Priority Data

Jul. 12, 2011   (JP) .................................. 2011-153967

(51) Int. Cl.
   *G01T 1/20*   (2006.01)
(52) U.S. Cl.
   USPC ........................................................ 250/366
(58) Field of Classification Search
   USPC ............................................. 250/366, 361 R
   See application file for complete search history.

(56) References Cited

U.S. PATENT DOCUMENTS 4,236,077 A * 11/1980 Sonoda et al. ............. 250/361 R
6,744,052 B1 * 6/2004 Petersson et al. ........ 250/370.11

* cited by examiner

*Primary Examiner* — Kiho Kim
(74) *Attorney, Agent, or Firm* — Fitzpatrick, Cella, Harper & Scinto

(57) ABSTRACT

A radiation detector including a scintillator structure comprising a first plane and a second plane which are not positioned on the same plane, the scintillator structure having an optical waveguiding property in a direction between the first plane and the second plane; and a two-dimensional light receiving element formed of multiple pixels which are disposed parallel to either one of the first plane and the second plane. The radiation detector includes at least one smoothness-deteriorate region which is positioned in one of the first plane and the second plane of the scintillator structure and has an area of 1/6 or more of a light receiving area of each of the multiple pixels. The region is repaired by an optically transparent material so as to be smoothed.

20 Claims, 3 Drawing Sheets

RADIATION DETECTOR

BACKGROUND OF THE INVENTION

1. Field of the Invention

The present invention relates to a radiation detector which uses a scintillator structure having an optical anisotropy.

2. Description of the Related Art

In an image detector for radiodiagnosis, an image of X-ray radiography is obtained as a digital signal by detecting an irradiated X-ray. The radiation detectors are roughly classified into a direct X-ray detector and an indirect X-ray detector. The indirect X-ray detector is a detector which changes X-ray into visible light by using phosphor, and converts the visible light into a charge signal by a photoelectric transducer so as to obtain an image. The detectors are arranged in a two-dimensional array. In a high-definition radiation detector, the pixel size needs to be reduced, and in a radiation detector used for obtaining a high-definition image as described above, a crosstalk of light can be suppressed by using a scintillator structure having an optical anisotropy.

In a high-definition radiation detection device, the pixel size is small, and hence, when a scintillator structure having an optical anisotropy is used, there has been newly found a problem that an influence on an image degradation by a flaw generated in the structure is not negligible. Conventionally, when the flaw size is sufficiently small as compared to an area of a light receiving portion, a loss influence of an optical waveguiding is negligible. However, as an area of a light receiving portion per pixel decreases, the loss influence of the optical waveguiding increases so that the influence on image degradation increases. This is because a flaw may be generated in the above-mentioned structure due to cutting, polishing, or handling regardless of the size of the pixel. The above-mentioned loss influence is caused by a material, typically the air, which has a refractive index different from that of the structure, at the portion where the flatness has been lost by the flaw.

When "X" represents an allowable threshold value of received light intensity fluctuation among the pixels, "A" represents a propagation loss coefficient per unit area by a flaw, "$S_0$" represents an area of the light receiving surface per pixel, and "S" represents an area of a flaw per one pixel, the following expression needs to be satisfied in order to keep the received light intensity fluctuation among the pixels equal to or less than "X".

$$A \times S/S_0 \leq X \qquad \text{Expression 1}$$

Here, the propagation loss coefficient A per unit area by a flaw is $0 \leq A \leq 1$, which is 0 when there is no flaw and is 1 when the light guiding is completely blocked by a flaw. In a strict sense, the propagation loss coefficient A per unit area by a flaw relates to a depth and a shape of the flaw. For simplification, it is assumed here that the flaws have the same depth and shape. Specifically, it is assumed that the depth and width of the flaws are the same, but the length or the number of the flaws is different. Such flaws correspond to, for example, flaws generated by polishing marks due to foreign matters having the same size, and the area S of the flaw per pixel as described above is determined by the length of the flaw or the number of the flaws.

The area $S_0$ of the light receiving surface per pixel and the area S of the flaw per pixel are restricted, and hence, in order to decrease the received light intensity fluctuation among the pixels, i.e., the value of the left side of the expression 1, the propagation loss coefficient A per unit area by the generated flaw inevitably needs to be decreased.

As the scintillator structure having the optical anisotropy described above, a scintillator structure having a phase-separated structure can be used. The scintillator structure having the phase-separated structure includes a first principal plane and a second principal plane which are positioned as different planes, and includes two phases including a first phase having a unidirectionality in a direction between the principal planes, and a second phase which fills a side of the first phase. A material of a higher refractive index phase of the two phases functions as a scintillator, thereby having an optical waveguiding property. In the radiation detection device using the scintillator structure having the phase-separated structure, there has been newly found a problem in that, when the flaw is positioned in the first or second principal plane of the structure and the minimum size of the depth or length is ¼ or more of an average distance "d" between proximate first layers of the above-mentioned phase-separated structure, the influence on the image degradation becomes remarkable. This depends on the number of the first layers per pixel, which is characterized by the above-mentioned average distance "d", with respect to the area $S_0$ of the light receiving surface per pixel. As the number of the first layers per pixel decreases, the influence on the image degradation increases.

SUMMARY OF THE INVENTION

The present invention has been made in view of such background art, and has an object to provide a radiation detector which can suppress a propagation loss coefficient A per unit area by a flaw, and has small received light intensity fluctuation among pixels.

Means for solving the above-mentioned problem is to repair the flaw portion by filling therein an optically transparent medium.

The above-mentioned problem can be solved with the following configuration of the present invention. According to an exemplary embodiment of the present invention, there is provided a radiation detector, including: a scintillator structure including a first principal plane and a second principal plane which are not positioned on the same plane, the scintillator structure having an optical waveguiding property in a direction between the first principal plane and the second principal plane; and a two-dimensional light receiving element formed of multiple pixels which are disposed parallel to either one of the first principal plane and the second principal plane, in which the radiation detector includes at least one smoothness-deteriorated region which is positioned in one of the first principal plane and the second principal plane of the scintillator structure and has an area of ⅙ or more of a light receiving area of each of the multiple pixels, the region being repaired by an optically transparent material so as to be smoothed.

According to another exemplary embodiment of the present invention, there is provided a radiation detector, including: a scintillator structure having a phase-separated structure, the scintillator structure including: a first principal plane and a second principal plane which are not positioned on the same plane, and two phases of a first phase having a unidirectionality with an optical waveguiding property in a direction between the first principal plane and the second principal plane and a second phase filling a side of the first phase, a material of a higher refractive index phase of the two phases functioning as a scintillator; and a two-dimensional light receiving element formed of multiple pixels which are disposed parallel to either one of the first principal plane and the second principal plane, in which the radiation detector includes at least one smoothness-deteriorated region which is positioned in one of the first principal plane and the second principal plane of the scintillator structure and has an area of ⅙ or more of a light receiving area of each of the multiple pixels, the region being repaired by an optically transparent material so as to be smoothed.

According to a further exemplary embodiment of the present invention, there is provided a radiation detector, including: a scintillator structure having a phase-separated structure, the scintillator structure including: a first principal plane and a second principal plane which are not positioned on the same plane, and two phases of a first phase having a unidirectionality with an optical waveguiding property in a direction between the first principal plane and the second principal plane and a second phase filling a side of the first phase, a material of a higher refractive index phase of the two phases functioning as a scintillator; and a two-dimensional light receiving element formed of multiple pixels which are disposed parallel to either one of the first principal plane and the second principal plane, in which the radiation detector includes at least one smoothness-deteriorated region which is positioned in one of the first principal plane and the second principal plane of the scintillator structure and has a width minimum size and a length minimum size which are ¼ or more of an average distance between proximate first phases of the phase-separated structure, the region being repaired by an optically transparent material so as to be smoothed.

According to an exemplary embodiment of the present invention, in the radiation detector, a refractive index of the optically transparent material used for the repairing falls within a range between a maximum value and a minimum value among three values of refractive indices of materials of two phases constituting the scintillator structure and a refractive index of a layer which faces the scintillator structure.

According to the present invention, in the high-definition radiation detection device which uses the scintillator structure having an optical anisotropy, the image degradation by the flaw generated in the structure can be suppressed, and the fluctuation among adjacent pixels due to the flaw can be decreased.

Further features of the present invention will become apparent from the following description of exemplary embodiments with reference to the attached drawings.

DESCRIPTION OF THE EMBODIMENTS

The present invention relates to a high-definition radiation detector which uses a scintillator structure having an optical anisotropy. The radiation detector of the present invention includes a first principal plane and a second principal plane which are positioned on the same plane, and includes a scintillator structure having an optical waveguiding property in the direction between the principal planes, and a two-dimensional light receiving element formed of multiple pixels which are disposed parallel to either one of the first and second principal planes. There has been newly found a problem that an influence on an image degradation by a flaw generated in such a scintillator structure having an optical anisotropy is not negligible, and the present invention has been made to solve this problem. A simulation analysis has been performed in order to quantitatively analyze the image degradation by a flaw. The results are described below, and embodiments of the invention are described in detail.

Figure 5:
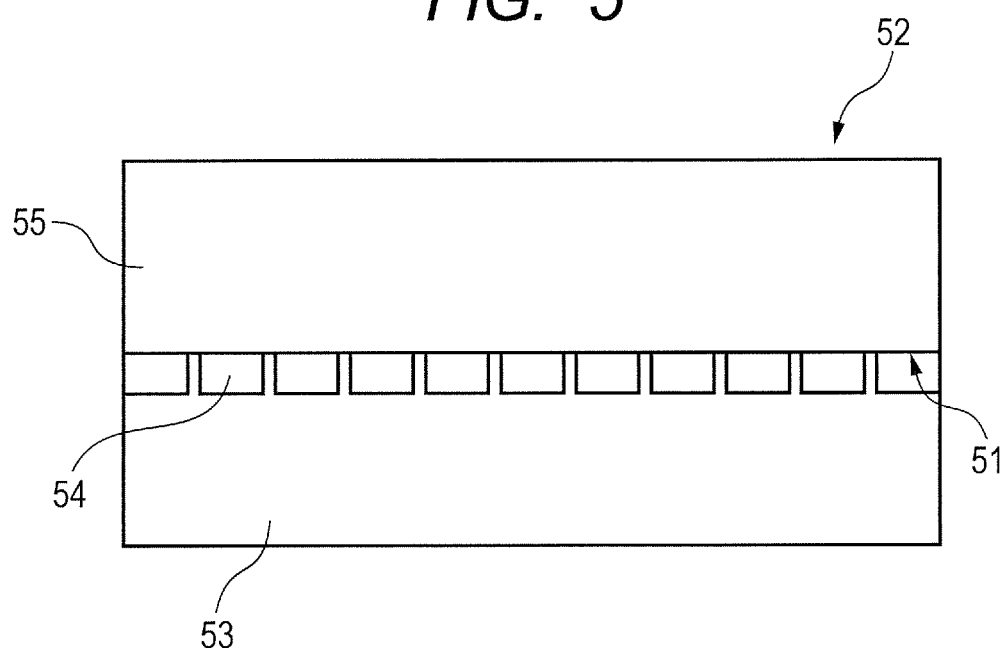
FIG. 5 is a view schematically illustrating a radiation detector according to the present invention.

Hereinafter, the embodiments of the present invention are described with reference to the drawings and the like. Note that, the embodiments of the present invention may include various modes (various configurations, and various materials). The common features of all the embodiments are that a scintillator crystal having a phase-separated structure, which includes two crystal phases including one crystal phase and the other crystal phase having a refractive index greater than that of the one crystal phase, includes portions where the other crystal phase is exposed to the first principal plane and the second principal plane which are not positioned on the same plane and that the portion of the other crystal phase exposed to the first principal plane is connected to the portion of the other crystal phase exposed to the second principal plane. With this, the light in the higher refractive index crystal phase is totally reflected by the lower refractive index crystal phase which is positioned around the higher refractive index phase, and as a result, the light is guided in the higher refractive index crystal so as to travel. At that time, because the higher refractive index crystal phase is exposed to the first principal plane and the second principal plane and the exposed portions are connected to each other, the waveguiding (light guiding) is directed to the first principal plane or the second principal plane. In other words, the light generated in the scintillator crystal travels toward the first principal plane or the second principal plane, while being confined within the other crystal phase having the higher refractive index (i.e., without spreading of the light). Thus, in all of the embodiments of the present invention, the scintillator crystal itself has a waveguiding function (light guiding function). Here, as illustrated in FIG. 5, for example, a first principal plane 51 is a plane which is opposed to a photodetector 54 disposed on a substrate 53, and a second principal plane 52 is a plane where a radiation, such as an X-ray, enters. With this, light generated in a scintillator crystal 55 can be guided toward the photodetector, and hence, a scintillator crystal with an excellent utilization efficiency of light can be provided, and a radiation detector having a high brightness and a high resolution using this scintillator crystal can be provided.

Note that, in the respective embodiments described below, it is preferred that the one crystal phase, which is the lower refractive index phase, also include portions which are exposed to the first principal plane and the second principal plane, and the exposed portions are connected to each other. With this, the light in the other crystal phase, which is the higher refractive index phase, can be more reliably guided to the first principal plane or the second principal plane without spreading.

Moreover, it is preferred that the one crystal phase, which is the lower refractive index phase, be positioned within the other crystal phase, which is the higher refractive index phase. With this, while suppressing the proportion of the one crystal phase, which is the lower refractive index phase, in the scintillator crystal, a sufficient waveguiding function (light guiding function) can be obtained.

Figure 2:
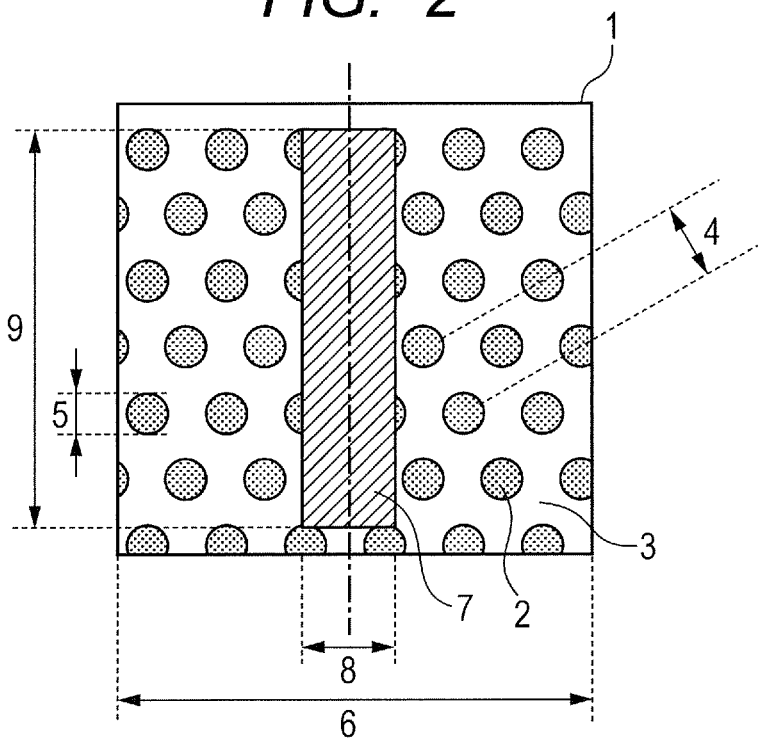
FIG. 2 is a schematic view illustrating a plane of an entire scintillator structure corresponding to one pixel and having a flaw, which is used for a simulation.
Figure 3:
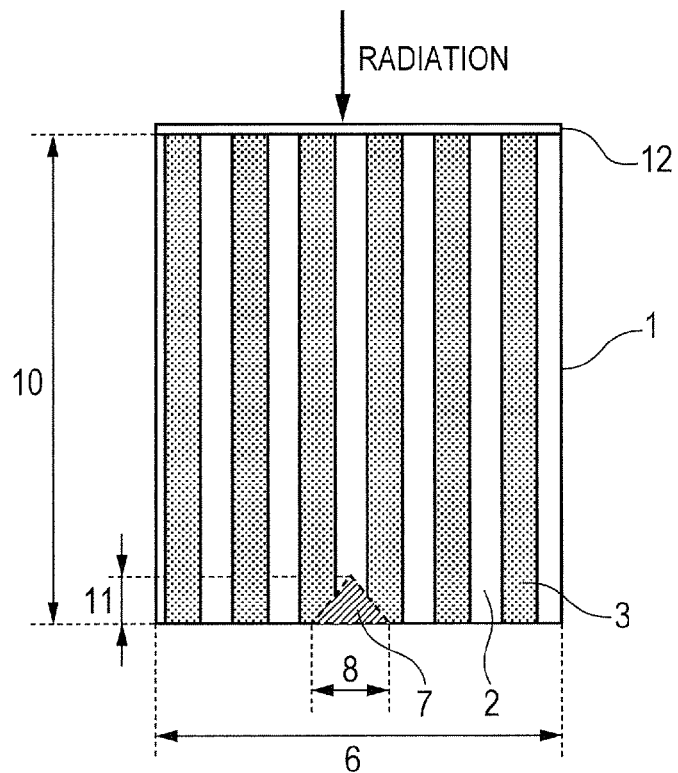
FIG. 3 is a schematic cross-sectional view of the entire scintillator structure corresponding to one pixel and having a flaw, which is used for the simulation.

A shape and size of the scintillator structure used in the simulation are described with reference to FIGS. 2 and 3. Note that, as an example of the scintillator structure having an optical anisotropy, a scintillator structure having an optical waveguiding property of a phase-separated structure is used. FIG. 2 is a front view of a surface of the scintillator structure, which is held in contact with the light receiving surface corresponding to one pixel of a photodetection element, and FIG. 3 is a cross-sectional view of the scintillator structure illustrated in FIG. 2. Note that, the front view of FIG. 2 is a front view seen from a lower portion of the cross-sectional view of FIG. 3, and the lower portion of FIG. 3 is a side of a surface which is held in contact with the light receiving surface. In FIG. 2, an entire scintillator structure 1 is held in contact with the light receiving surface corresponding to one pixel of a photodetection element. The scintillator structure 1 includes a first phase 2 and a second phase 3. The phase-separated structure has a period 4. The first phase 5 has a diameter 5. The scintillator structure 1, which is held in contact with the light receiving surface corresponding to one pixel, has a side having a length 6 on one side thereof. A flaw 7 has a width 8 and a length 9. Then, the first phase 2 has an optical waveguiding property in the direction between the first principal plane and the second principal plane so as to have a unidirectionality. As illustrated in FIG. 3, the scintillator structure 1 has a thickness 10, and the flaw 7 has a depth 11. A reflective film 12 is provided to the scintillator structure 1. Note that, in FIG. 3, the members identical with the members illustrated in FIG. 2 are represented by the same reference numerals. Moreover, FIGS. 2 and 3 are schematic views, and the structure scale of the scintillator structure having an optical anisotropy with respect to the pixel size does not correspond to the actual scale. FIGS. 2 and 3 are merely intended to clearly illustrate a positional relationship between the pixel and the structure.

Next, the numerical parameters are described. For a specific exemplification, the parameter of the material system including cesium iodide and sodium chloride, which is an example of the scintillator structure having a phase-separated structure, is used. Therefore, the first phase 2 is a crystal made of sodium chloride (NaCl), and the refractive index is 1.55. The second phase 3 is a crystal made of cesium iodide (CsI), and the refractive index is 1.78. The periodic structure 4 of the phase-separated structure is 4 micrometers, the diameter 5 of the first phase is 2 micrometers, and the arrangement is triangular lattice arrangement. The length 6 of one side of the scintillator structure corresponding to one pixel is 300 micrometers, the width 8 of the flaw is 40 micrometers, the length 9 of the flaw is 250 micrometers, and the position of the flaw is located at the central portion. The thickness 10 of the scintillator structure is 500 micrometers, and the depth 11 of the flaw is 20 micrometers.

Next, assumption of the simulation is described. A light source is disposed in an internal region of a square pole having a side of 290 micrometers and a thickness of 500 micrometers at the central portion of a radiation incidence side at the upper portion of FIG. 3. The light source here corresponds to the scintillation. The light source is set to have 1,000 lumens. The radiation is an X-ray, and is assumed to be exponentially attenuated from the incidence side. It is assumed that 99% of the X-ray is absorbed by the thickness of 500 micrometers. The emitted light has such an optical anisotropy that the components, which reach the light receiving surface side after being propagated through CsI as the higher refractive index phase, become large. This is achieved by repeating, under the total reflection condition in accordance with the refractive index difference between the two phases, the total reflection of the light at the higher refractive index phase, and thereby propagating to the light receiving surface side to function as a scintillator. Note that, in this simulation, an incidence at an angle not satisfying the total reflection condition is assumed to have a reflectance of 5%. Moreover, the light beams that reach the four sides orthogonal to the light receiving surface side are assumed to be absorbed so as not to reach the light receiving surface side. Only a refraction and a reflection are considered, and an influence of scattering is not considered. The direction of the light, which is propagated in the direction opposite to the light receiving surface side, is corrected by the reflective film 12 so as to be propagated to the light receiving surface side.

Figure 4:
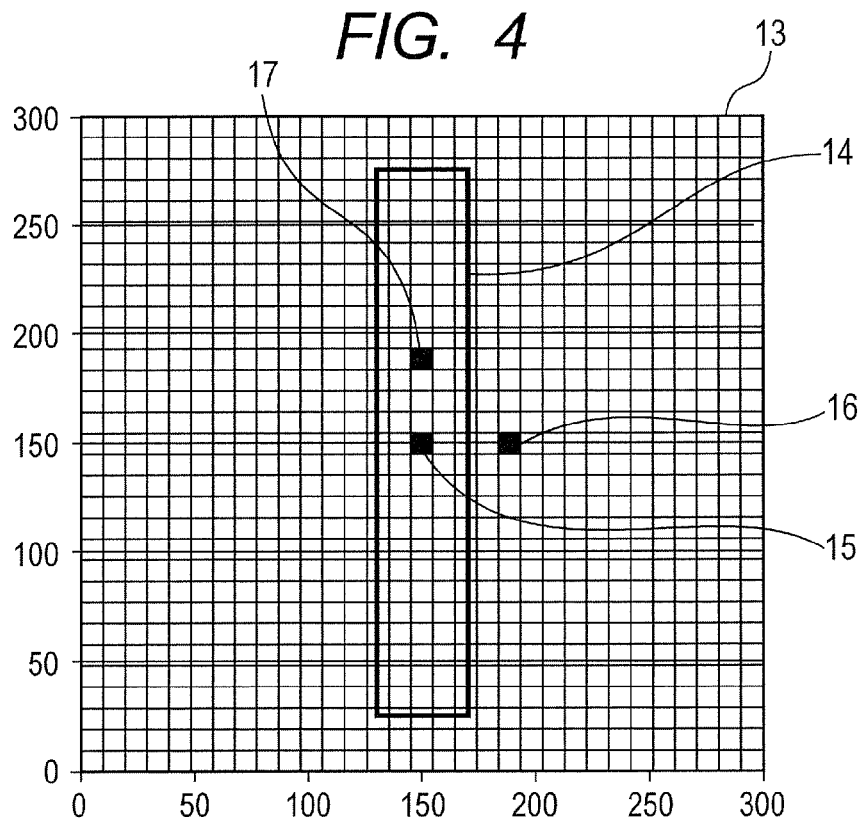
FIG. 4 is a view schematically illustrating a plane in which the scintillator structure corresponding to one pixel and having a flaw is virtually divided into 31×31 sections equally, which is used for the simulation.

Under the above-mentioned assumption, the number of beams is set to be one million, and the number of beams which reach the light receiving surface side is calculated. The light receiving surface is virtually divided to have a lattice shape by equally dividing the one side of 300 micrometers into 31 sections each of which has a side of about 9.68 micrometers, and the number of beams is calculated for each of the 31×31 areas. The schematic view of this division is illustrated in FIG. 4. In FIG. 4, an entire scintillator structure 13 corresponding to the divided one pixel includes an area 14 corresponding to the flaw, a central section 15, a section 16 without a flaw, and a section 17 with a flaw. The section 16 without a flaw is spaced by a distance corresponding to four sections from the central section 15, and similarly, as for the section 17 directly under the flaw, a portion which is spaced by a distance corresponding to four sections from the central section 15 is selected.

With respect to the number of beams of one million, the following value A is calculated by using the number $C_0$ of beams which reach the section 16 without a flaw and the number $C_1$ of beams which reach the section 17 directly under the flaw. This value A can be considered as a propagation loss coefficient per unit area.

$$A = (C_0 - C_1)/C_c \quad \text{Expression 2}$$

Here, the value A is 0 when there is no flaw because $C_0 = C_1$, and takes a value of from 0 to 1.

As a result of the simulation, the value A is 0.6 when rounded off to one decimal place. This means that 60% of the light beams traveling toward directly under the flaw is lost by the flaw. From this value, it can be sufficiently understood that the problem becomes more serious as the proportion of the flaw size in the light receiving area becomes larger.

Here, when calculating by using the above-mentioned Expression 1, the following expression can be obtained by using A=0.6.

$$0.6 \times S/S_0 \leq X \quad \text{Expression 3}$$

Although the allowable threshold value X can be changed depending on an image processing method, the value of 0.1 or less is preferred in order to obtain an image of good quality. Then, when the allowable threshold value is 0.1, the following expression is obtained.

$$S/S_0 \leq 1/6 \quad \text{Expression 4}$$

Therefore, when the area S of the flaw per pixel is more than ⅙ of the area $S_0$ of the light receiving surface per pixel, the existence of such a smoothness-deteriorated region is not allowable. The flaw is generated by cutting, polishing, or handling of the scintillator crystal. A typical example thereof is a flaw of a line shape which is generated during a polish, and its width can be up to about tens of micrometers so that the complete removal of the flaw is difficult. When the area $S_0$ of the light receiving surface per pixel is, for example, of the scale of about 1 millimeter, $S/S_0$ is sufficiently negligible. However, when the scale of the light receiving surface is, for example, about 100 micrometers or less, Expression 4 cannot be satisfied. Moreover, such a line-shaped flaw may be generated over multiple pixels, thereby extremely degrading an image quality.

In order to reduce such influence of a flaw, when the area S of a flaw per pixel is restricted, the propagation loss coefficient A per unit area by a flaw inevitably needs to be decreased. The propagation loss coefficient A per unit area by a flaw closely relates to the refractive index of the flaw portion, and the refractive index is about 1.0 when the flaw portion is filled with the air, thereby providing a great difference from the refractive index of a high refractive index material used for waveguiding. When the flaw portion is filled with an optically transparent material having a refractive index greater than that of the air so as to be repaired and smoothed, the propagation loss coefficient A per unit area by a flaw can be decreased. This is because the propagation loss coefficient A per unit area by a flaw is determined by a refractive index ratio between the material for filling the flaw portion and the high refractive index material used for waveguiding. The decrease of the propagation loss coefficient A per unit area by a flaw in accordance with the refractive index is described later in Example 1 as a relationship between the refractive index of the material for filling the flaw and the propagation loss coefficient A per unit area by a flaw.

As described above, in a strict sense, the propagation loss coefficient A per unit area by a flaw relates to the depth and shape of the flaw. However, it is extremely difficult to individually determine the influence of propagation loss by the shape and depth of the flaw, and the shape and numerical parameters used in the above-mentioned simulation are assumed to be able to qualitatively represent the actual values. For any flaws, by filling the flaw portion with an optically transparent material having a refractive index greater than that of the air, the propagation loss coefficient A per unit area by a flaw can be decreased.

As the preferred optically transparent material for filling the flaw portion, there can be used general optical resins such as an epoxy resin (refractive index of 1.55 to 1.61) a melamine resin (refractive of index 1.6), nylon (refractive index of 1.53), polystyrene (refractive index of 1.6), polyethylene (refractive index of 1.53), a methyl methacrylate resin (refractive index of 1.49), an MBS resin (refractive index of 1.54), a vinyl chloride resin (refractive index of 1.54), a vinylidene chloride resin (refractive index of 1.61), a vinyl acetate resin (refractive index of 1.46), and polycarbonate (refractive index of 1.59). Materials other than the above-mentioned materials may be used as long as they are optically transparent.

Next, with reference to FIG. 2, there is described a flaw which becomes newly problematic and peculiar to the case where a scintillator crystal having an optical waveguiding property of a phase-separated structure is used as the scintillator structure having an optical anisotropy.

In FIG. 2, the scintillator structure 1 includes the first phase 2 and the second phase 3 on the surface held in contact with the light receiving surface corresponding to one pixel of the photodetection element. The scale of the phase-separated structure with respect to the light receiving surface corresponding to one pixel is characterized by the period 4 of the phase-separated structure and the diameter 5 of the first phase with respect to the length 6 of one side of the scintillator structure held in contact with the light receiving surface corresponding to one pixel. When the diameter 5 of the first phase becomes large relative to the length 6 of one side of the scintillator structure held in contact with the light receiving surface corresponding to one pixel and when there is a difference in number of the first phases 2 between the pixels, a problem may arise in fluctuation. Therefore, it is desired that the suitable diameter 5 of the first phase be selected. When the phase-separated structure is manufactured in the vicinity of an eutectic composition, the structure scale of the phase-separated structure is determined by the material and the conditions of manufacturing. The period 4 of the phase-separated structure and the diameter 5 of the first phase are not independently controlled, and a volume ratio in accordance with a composition ratio is realized. In order to realize a desired scale, the manufacturing conditions represented by a growth rate are to be controlled. Specifically, the diameter 5 of the first phase is controlled in a range of nanometers or more and 30 micrometers or less, preferably 200 nanometers or more and 10 micrometers or less. The period 4 of the phase-separated structure is controlled in a range of 500 nanometers or more and 50 micrometers or less, preferably 1 micrometer or more and 20 micrometers or less.

For example, when the periodic structure 4, which is assumed in the simulation as a typical structure scale, is 4 micrometers, the diameter 5 of the first phase is 2 micrometers, and one side of the square light receiving surface of one pixel is 20 micrometers, about 29 first phases 2 are to be included. Under the conditions corresponding to such a scale relationship, there are manufactured scintillator structures actually including flaws of various sizes, and an influence of the received light intensity with respect to the size of the flaw is measured. Then, there is found a received light intensity remarkably changed when the width or length is ¼ or more of the period of structure. Specifically, when there is a smoothness-deteriorated region due to a flaw of line shape whose width corresponding to ¼ of the structure period (average distance between proximate first phases) is 1 micrometer or more, an extreme change of the received light intensity is found. This is conceivably because the optical waveguiding of the phase-separated structure has an anisotropy in one axial direction and thus the angular dependency of the light beam entering the flaw portion is inclined so as to sensitively respond to the propagation loss coefficient A per unit area by a flaw. As described above, as a result of an evaluation of an image quality with respect to an actual flaw, when a scintillator structure having an optical waveguiding property of a phase-separated structure is used, the width or length of the flaw with respect to the period of the structure needs to be considered. Also in this case, by filling the flaw portion with an optically transparent material having a refractive index greater than that of the air so as to be repaired and smoothed, the propagation loss coefficient A per unit area by a flaw can be decreased.

Note that, it is sufficient that only the flaw portion is filled with a transparent material, but there is no problem even when a small amount of the transparent material is also adhered to the portions other than the flaw portion. Rather, during the actual process of filling the flaw, the material tends to be adhered to the light receiving surface side in such a small amount as to be a residue. In this case, as long as the amount is not extremely large, there is no problem, and when the influence of interference of light due to the adhered film is small, no problem arises. Moreover, at the same time when the flaw portion is filled, the film may be intentionally formed so as to also cover the other region.

EXAMPLE 1

This example is an example based on the simulation described in the above-mentioned embodiment.

Specifically, this example describes a change of the propagation loss coefficient A per unit area by a flaw when the refractive index of the material for filling the flaw portion was varied. This is a case in which a scintillator structure having an optical waveguiding property of a phase-separated structure was used as the scintillator structure having an optical anisotropy. The first phase 2 was made of sodium chloride (NaCl), and the second phase 3 was made of cesium iodide (CsI). The numerical parameters and the assumption of the simulation were the same as those described in the above-mentioned embodiment, and only the refractive index of the material for filling the flaw portion is varied. The refractive index of NaCl was 1.55, and the refractive index of CsI was 1.78.

There are five kinds of refractive indexes of the material for filling the flaw portion as described below. Note that, as a case in which the flaw portion is not filled, a calculation is performed with respect to the refractive index of 1.0 for the air.

The five kinds of refractive indexes are as follows.
1) 1.3 for the case in which the refractive index of the material is smaller than that of any one of NaCl and CsI.
2) 1.55 for the case in which the refractive index of the material is the same as NaCl.
3) 1.65 for the case in which the refractive index of the material has a value between those of NaCl and CsI.
4) 1.78 for the case in which the refractive index of the material is the same as CsI.
5) 2.0 for the case in which the refractive index of the material is greater than that of any one of NaCl and CsI.

Figure 1:
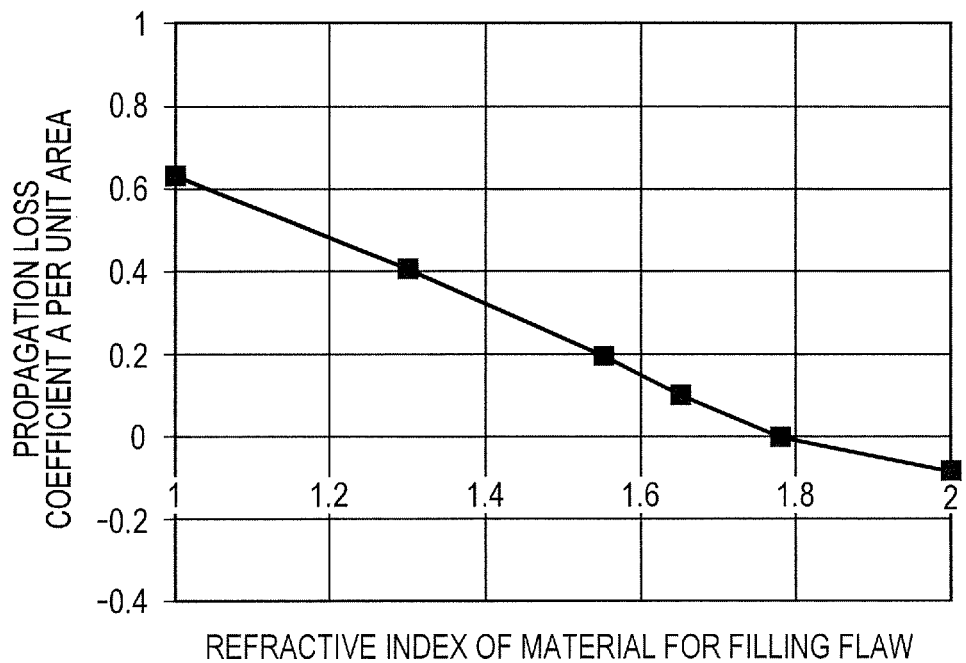
FIG. 1 is a graph showing a relationship between a refractive index and a propagation loss coefficient A per unit area by a flaw according to Example 1 of the present invention.

FIG. 1 is a graph in which the vertical axis represents the value of the propagation loss coefficient A per unit area by a flaw, and the horizontal axis represents the refractive index. In the graph, as the case in which the flaw portion is not filled, there is shown a case in which the refractive index of the air is 1.0.

Referring to FIG. 1, the propagation loss is minimum when the refractive index of the material for filling the flaw portion is equal to the refractive index of CsI which is the high refractive index material used for waveguiding. When the refractive index of the material for filling the flaw portion is larger than that of CsI, the propagation loss coefficient A per unit area by a flaw becomes a negative value, which shows an increase of the intensity of light.

Note that, in general, there are few optically transparent materials whose refractive indices are more than 1.7. As previously mentioned in the embodiment, the refractive index of a general optical resin is normally about 1.5. When the optical resin having a refractive index of 1.55 of the above-mentioned item 2) is used, the propagation loss coefficient A per unit area by a flaw becomes 0.2, and hence the propagation loss coefficient A per unit area by a flaw can be actually decreased to one third as compared to the case in which the flaw is not filled. With this, the fluctuation among the pixels by the flaw is directly decreased, thereby improving the image quality. When the area S of the flaw per pixel is ⅙ of the area $S_0$ of the light receiving surface per pixel, the fluctuation among the pixels can be decreased to 1/30. Accordingly, it can be understood that by repairing the flaw which is ⅙ or more of the light receiving area, the fluctuation among the pixels can be greatly suppressed.

In this example, the scintillator structure having an optical waveguiding property of a phase-separated structure is described, but other scintillator structures having an anisotropy in a light propagation using two phases whose refractive indices are different from each other can be applied. As long as a total reflection in accordance with the refractive index difference is used as an optical waveguiding in principle, this simulation can be applied so that the influence of the flaw can be effectively decreased by decreasing the propagation loss coefficient A per unit area by a flaw.

EXAMPLE 2

This example relates to the size of a flaw and an image quality when the scintillaor structure having an optical waveguiding property of a phase-separated structure was used as the scintillator structure having an optical anisotropy. Here, the size of a flaw means a minimum size of any one of a width and a length of the flaw. Specifically, a flaw of a line shape, which is considered to be generated during polishing of the crystal, is observed, and the minimum size corresponds to the width of the flaw.

The scintillator structure having optical waveguiding property of a phase-separated structure is described. In the scintillator structure used here, the first phase includes a crystal made of sodium chloride (NaCl) and the second phase includes a crystal made of cesium iodide (CsI). The diameter of sodium chloride which is the first phase is 1.6 micrometers, and the period of the structure is 4 micrometers. This structure was cut out so that the columnar crystal of sodium chloride which is the first phase became orthogonal to the light receiving surface, and after that, the structure was polished. A lapping sheet was used for the polishing, and the grain size of the abrasion grain was gradually decreased. Then, the structure was finished so as to have a thickness of 0.5 millimeters.

The flaw was investigated by observing the finished structure with an optical microscope. There were observed flaws of line shapes at some positions, which were considered to be generated during the polishing. Positions of the flaws having widths of 0.5 micrometers, 1 micrometer, 2 micrometers, 5 micrometers, and 10 micrometers, were recorded, and were matched with the image quality when performing imaging described below.

Next, imaging is described. The above-mentioned crystal of the phase-separated structure was disposed so as to come into contact with the light receiving element disposed in a two dimensional state whose pixel pitch is 20 micrometers. After that, an X-ray was applied from one surface side which is parallel to the surface held in contact with the two-dimensional light receiving element, and an image of the two-dimensional light receiving element was evaluated. The X-ray was generated by an X-ray irradiation apparatus, and the two-dimensional light receiving element described above was located in a dark room portion of the X-ray irradiation apparatus. The X-ray in use was obtained by using a tungsten target at an acceleration voltage of 60 kV.

The image obtained by the imaging was compared with the information of the widths and the positions of the flaws which had been investigated in advance by the optical microscope, thereby evaluating the influence of the flaws on the image quality. As a result, regarding the flaw whose width was 0.5 micrometers, a decrease in the image quality was not detected. On the other hand, regarding the flaws whose widths were 1 micrometer, 2 micrometers, 5 micrometers, and 10 micrometers, changes of brightness were observed at the pixels corresponding to the positions of the flaws. According to the results described above, it can be understood that when the scintillator structure having an optical waveguiding property of a phase-separated structure is used, the flaw whose minimum size is ¼ or more of the period of the structure is desired to be repaired.

Next, in order to decrease the value of the propagation loss coefficient A per unit area by a flaw, the flaw portion of the scintillator crystal described above was filled with an optically transparent resin. First, the above-mentioned scintillator structure was removed from the two-dimensional light receiving element, and the flaw portion was filled with polymethylmethacrylate whose refractive index was 1.49. The material protruding from the flaw portion was removed by using a squeegee. After that, it was confirmed by an optical microscope that the flaw portion was filled with polymethylmethacrylate, and then, an image evaluation similar to the previous evaluation was performed. As a result, no influence was recognized regarding the flaws whose widths were 0.5 micrometers, 1 micrometer, and 2 micrometers. Regarding the flaw portions whose widths were 5 micrometers and 10 micrometers, an influence of the flaw was still observed, but the influence was greatly reduced as compared to the case in which the flaw was not filled. This is because the flaw portion was filled with a transparent resin whose refractive index was extremely greater than that of the air, i.e., 1, so that the propagation loss was suppressed.

EXAMPLE 3

Similarly to Example 2, this example relates to a case in which the scintillator structure having an optical waveguiding property of a phase-separated structure was used. As an optically transparent resin for filling the flaw portion, instead of polymethylmethacrylate which was used in Example 2, an epoxy resin whose refractive index was greater than that of polymethylmethacrylate was used. The refractive index is 1.61 which is a refractive index having a value between those of sodium chloride which is the first phase (refractive index of 1.55) and cesium iodide which is the second phase (refractive index of 1.78).

The scintillator structure used here is the same as that used in Example 2, and the diameter of sodium chloride which is the first phase is 1.6 micrometers, and the period of the structure is 4 micrometers. This structure was cut out so that the columnar crystal of sodium chloride which is the first phase became orthogonal to the light receiving surface, and after that, the structure was polished. A lapping sheet was used for the polishing, and the grain size of the abrasion grain was gradually decreased. Then, the structure was finished so as to have a thickness of 0.5 millimeters.

The flaw was investigated by observing the finished structure with an optical microscope. There were observed flaws of line shapes at some positions, which were considered to be generated during the polishing. Positions of the flaws having a width of 10 micrometers were recorded, and were matched with the image quality when performing imaging.

Next, similarly to Example 2, an X-ray was applied so as to confirm the influence of the flaw. After that, the flaw portion was filled with an epoxy resin whose refractive index was 1.61. The material protruding from the flaw portion was removed by using the squeegee. After that, it was confirmed by an optical microscope that the flaw portion was filled with the epoxy resin, and then, an image evaluation similar to the previous evaluation was performed. As a result, it was found that a decrease in the image quality at the pixel corresponding to the flaw portion whose width was 10 micrometers was small, and a further improvement was observed as compared to the case of Example 2 in which polymethylmethacrylate was used. Specifically, for the flaw portion whose width was 10 micrometers, the difference of brightness among the pixels including the pixel corresponding to the flaw portion was decreased to 10% or less. This is because the flaw portion was filled with the epoxy resin having a refractive index between those of sodium chloride and cesium iodide. This result corresponds to the simulation result shown in FIG. 1. According to the simulation, by filling the flaw with a material having a refractive index identical with that of cesium iodide used for a light propagation, the propagation loss coefficient A per unit area by a flaw can be minimized, but a refractive index of an optically transparent resin is actually restricted. In this case, the propagation loss coefficient A per unit area by a flaw can be decreased by setting a refractive index as close to that of the material used for propagation as possible, but the selection is preferred to be performed by comprehensively considering its cost and effect. Moreover, considering that, as a layer facing the scintillator structure, a protective film, such as a silicon nitride film (refractive index of 2.0), is normally formed on the outermost surface of the two-dimensional light receiving element, the preferred range of the refractive index of the optically transparent material is as follows.

Namely, the preferred range of the refractive index of the optically transparent material is between the minimum value and the maximum value among the three values, i.e., the refractive indices of the materials of the two phases constituting the scintillator structure, and the refractive index of the layer held in contact with the scintillator structure.

In the above-mentioned examples, as the scintillator structure having the optical transparency of the phase-separated structure, the material formed of the two phases of sodium chloride and cesium iodide was used, but the material is not limited thereto. Any scintillator structure having an optical anisotropy is available, and particularly, a scintillator structure which includes two phases and uses a total reflection by a refractive index difference is preferred.

The flaw generated in the surface held in contact with the two-dimensional light receiving element has been described, but a flaw generated in a surface which is parallel to the above-mentioned surface and in which a radiation enters can be also applied.

The radiation detector of the present invention is suitable for obtaining a high-definition image. Particularly, the radiation detector can be used for measuring apparatus using a radiation, such as an X-ray, for a medical application, an industrial application, an application to high-energy physics, and an application to an outer space.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-153967, filed Jul. 12, 2011, which is hereby incorporated by reference herein in its entirety.

What is claimed is:

1. A radiation detector comprising:
a scintillator structure including a first plane and a second plane, which are not positioned on a same plane, the scintillator structure having an optical waveguiding property in a direction between the first plane and the second plane; and
a light receiving element,
wherein the radiation detector includes at least one smoothness-deteriorated region positioned in one of the first plane and the second plane of the scintillator structure, the region being smoothed by an optically transparent material.

2. A radiation detector according to claim 1, wherein a refractive index of the optically transparent material is between a maximum value and a minimum value of a refractive index of the first phase, a refractive index of the second phase, and a refractive index of a layer disposed on the scintillator structure.

3. A radiation detector according to claim 1, wherein the optically transparent material includes a material selected from the group consisting of an epoxy resin, a melamine resin, nylon, polystyrene, polyethylene, a methyl methacrylate resin, an MBS resin, a vinyl chloride resin, a vinylidene chloride resin, a vinyl acetate resin, and polycarbonate.

4. A radiation detector according to claim 1,
wherein the scintillator structure includes a first crystal phase having a first refractive index and a second crystal phase having a second refractive index greater than the refractive index of the first crystal phase, and
wherein a portion of the second crystal phase is exposed to the first plane, a portion of the second crystal phase is exposed to the second plane, and the portion of the second crystal phase exposed to the first plane and the portion of the second crystal phase exposed to the second plane are connected to each other.

5. A radiation detector according to claim 4, wherein a portion of the first crystal phase is exposed to the first plane, a portion of the first crystal phase exposed to the second plane, and the portion of the first crystal phase exposed to the first plane and the portion of the first crystal phase exposed to the second plane are connected to each other.

6. A radiation detector according to claim 4, wherein the one of the first and second crystal phases is positioned in the other of the first and second crystal phases.

7. A radiation detector according to claim 1, wherein the radiation includes an X-ray.

8. A radiation detector according to claim 1,
wherein the light receiving element includes multiple pixels positioned opposite to at least the first plane or the second plane, and
wherein an area of the smoothness-deteriorated region per pixel is at least 1/6 of an area of a light receiving surface per pixel.

9. A radiation detector according to claim 8, wherein the multiple pixels are disposed parallel to either one of the first plane and the second plane.

10. A radiation detector according to claim 8, wherein the smoothness-deteriorated region is repaired by the optically transparent material.

11. A radiation detector according to claim 1, wherein the smoothness-deteriorated region is repaired by the optically transparent material.

12. A radiation detector comprising:
a scintillator structure having a phase-separated structure, the scintillator structure including:
a first plane and a second plane, which are not positioned on a same plane,
a first phase having a unidirectionality with an optical waveguiding property in a direction between the first plane and the second plane, and
a second phase adjacent to the first phase; and
a light receiving element,
wherein a material of one of the first and second phases having a higher refractive index functions as a scintillator, and
wherein the radiation detector includes at least one smoothness-deteriorated region positioned in one of the first plane and the second plane of the scintillator structure, the region being smoothed by an optically tranparent material.

13. A radiation detector according to claim 12,
wherein the smoothness-deteriorated region has a minimun width and a minimun length that are at least 1/4 of an average distance between proximate first phases of the phase-separated structure.

14. A radiation detector according to claim 12, wherein a portion of the second phase is exposed to the first plane, a portion of the second phase is exposed to the second plane, and the portion of the second phase exposed to the first plane and the portion of the second phase exposed to the second plane are connected to each other.

15. A radiation detector according to claim 14, wherein a portion of the first phase is exposed to the first plane, a portion of the first phase is exposed to the second plane, and the portion of the first phase exposed to the first plane and the portion of the first phase exposed to the second plane are connected to each other.

16. A radiation detector according to claim 14, wherein the first phase is positioned in the second phase.

17. A radiation detector according to claim 12, wherein a period of the phase-separated structure is in a range from 500 nanometers to 50 micrometers.

18. A radiation detector according to claim 12, wherein the first phase includes a crystal of sodium chloride, and the second phase includes a crystal of cesium iodide.

19. A radiation detector according to claim 12, wherein a diameter of the first phase is in a range from 50 nanometers to 30 micrometers.

20. A radiation detector according to claim 12,
wherein the light receiving element includes multiple pixels positioned opposite to at least the first plane or the second plane, and
wherein an area of the smoothness-deteriorated region per pixel is at least 1/6 of an area of a light receiving surface per pixel.

* * * * *